United States Patent [19]
Ylvisaker

[11] 3,836,176
[45] Sept. 17, 1974

[54] BICYCLE SAIL

[76] Inventor: Carl J. Ylvisaker, 133 Harding Blvd., Oregon City, Oreg. 97045

[22] Filed: Dec. 8, 1972

[21] Appl. No.: 313,553

[52] U.S. Cl. .............................................. 280/213
[51] Int. Cl. ........................................... B62j 39/00
[58] Field of Search .................... 280/213, 11.37 S; 296/78.1

[56] References Cited
UNITED STATES PATENTS

| 694,388 | 3/1902 | Kaucher | 296/78.1 |
| 3,690,721 | 9/1972 | Herbert | 296/78.1 |

FOREIGN PATENTS OR APPLICATIONS

| 23,828 | 12/1894 | Great Britain | 280/213 |
| 143,469 | 5/1920 | Great Britain | 296/78.1 |
| 21,468 | 10/1902 | Great Britain | 280/213 |
| 939,853 | 11/1948 | France | 280/213 |

*Primary Examiner*—David Schonberg
*Assistant Examiner*—Terrance L. Siemens
*Attorney, Agent, or Firm*—Kolisch, Hartwell, Dickinson & Stuart

[57] ABSTRACT

Apparatus for sailing a bicycle including a base adapted for detachable mounting on the front of a bicycle, an upright mast removably journaled on the base for turning about a generally upright axis, a sail mounting assembly removably attached to the mast, and a transparent sail removably mounted on the sail mounting assembly.

6 Claims, 4 Drawing Figures

PATENTED SEP 17 1974 3,836,176

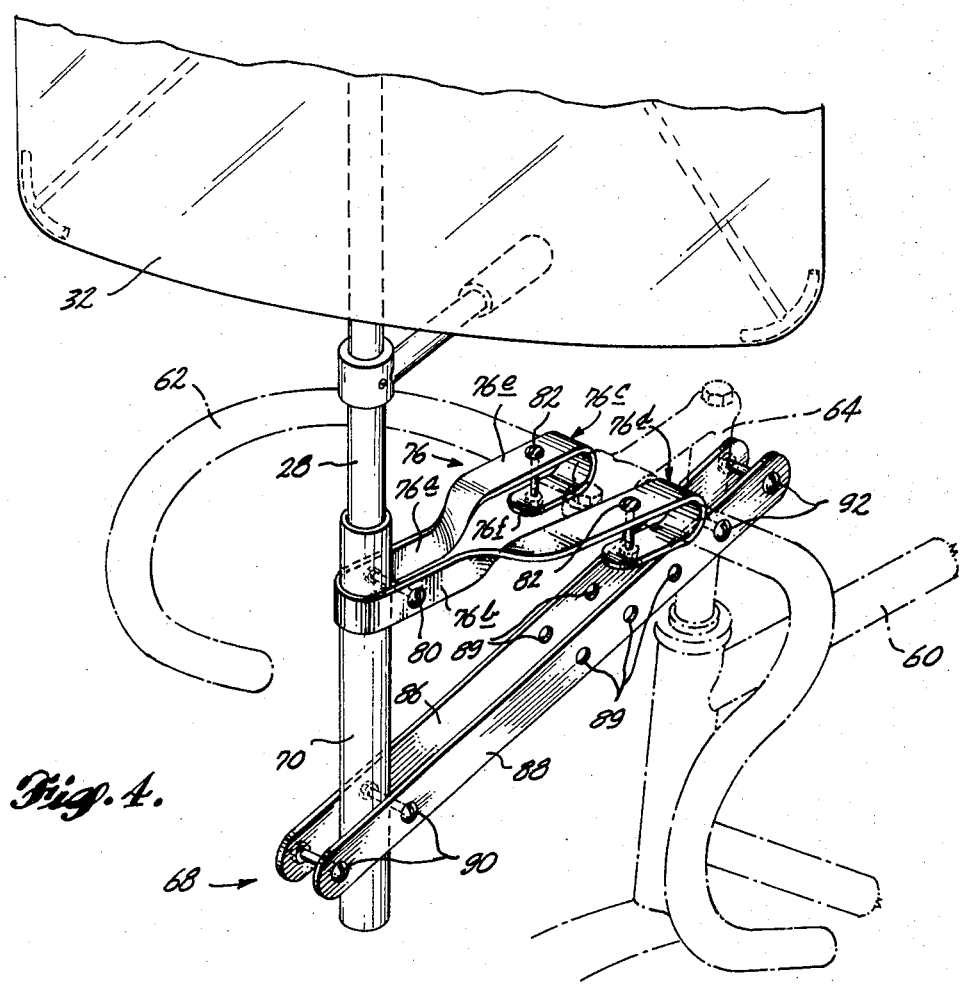

3,836,176

BICYCLE SAIL

BACKGROUND AND SUMMARY OF THE INVENTION

This invention pertains to apparatus for sailing a bicycle, and more particularly, to such apparatus which is removably mountable on the front of a conventional bicycle.

At various times, bicycle sailing (i.e., using wind power to propel a bicycle over the ground) has emerged as a recreational sport. Prior apparatus for enabling bicycle sailing, however, has had certain drawbacks. For example, such apparatus has typically required significant modifications in the constructions of bicycles. Also, prior-known apparatus has often been inconvenient to use, inasmuch as it is typically disposed adjacent the rear end of a bicycle, behind where the rider sits.

A general object of the present invention, therefore, is to provide an improved form of bicycle sailing apparatus which overcomes these drawbacks in a practical and satisfactory manner.

More specifically, an object of the invention is to provide such apparatus which can easily be incorporated in various bicycle constructions without requiring modifications thereof.

A further object is to provide apparatus of the type generally outlined which, when mounted for use in a bicycle, is disposed in front of the rider and is, accordingly, quite convenient to operate.

Yet another object of the present invention is to provide such sailing apparatus which is adapted for quick removable mounting of its parts on the frame in a bicycle.

Thus, and according to a preferred embodiment of the invention, the proposed sailing apparatus includes a base adapted for detachable mounting on the front of a bicycle frame, an upright mast removably journaled on the base for turning about a generally upright axis, a "knock-down" sail mounting assembly removably attached to the mast, and a transparent sail removably mounted on the sail mounting assembly. A crank joined to the mast is provided for adjusting the angular position thereof, and also the angular position of the sail.

The various advantages attained by the just-outlined construction, as well as other objects and advantages attained by the invention, will become more fully apparent as the description which follows is read in conjunction with the accompanying drawings, wherein:

FIG. 4 is a perspective view of a modified sail supporting base for detachable mounting on the handlebars of a bicycle.

DETAILED DESCRIPTION OF THE INVENTION

Figure 1:
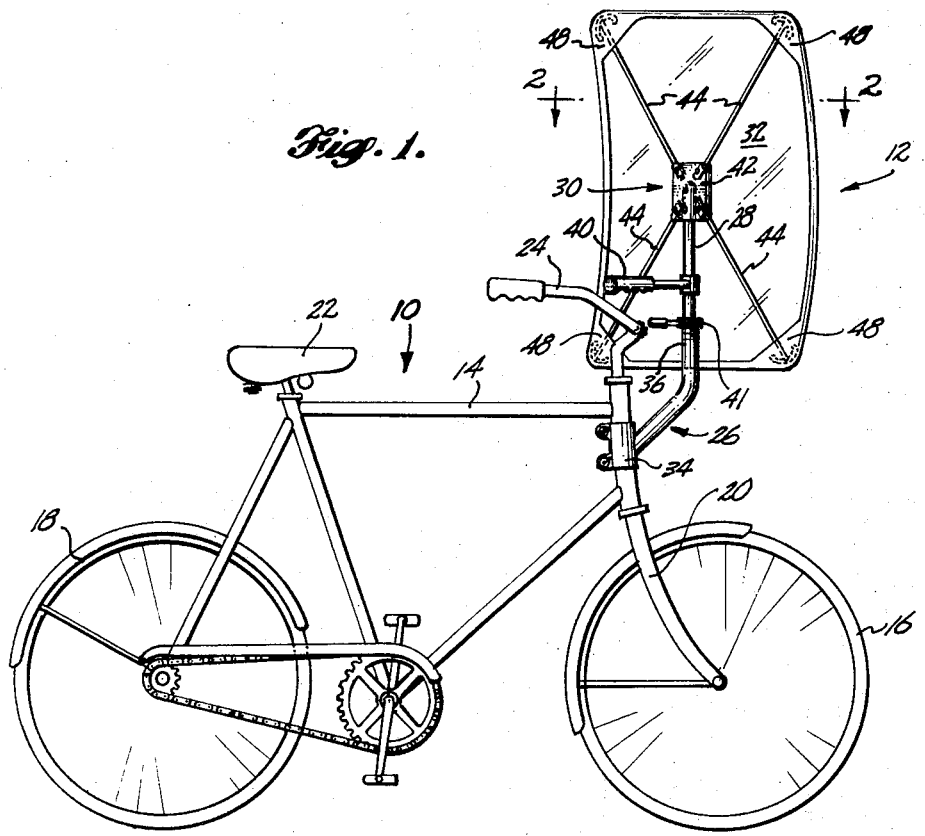
FIG. 1 is a side elevation view of a bicycle with apparatus constructed according to an embodiment of the invention mounted in operative position on the front of the bicycle.
Figure 2:
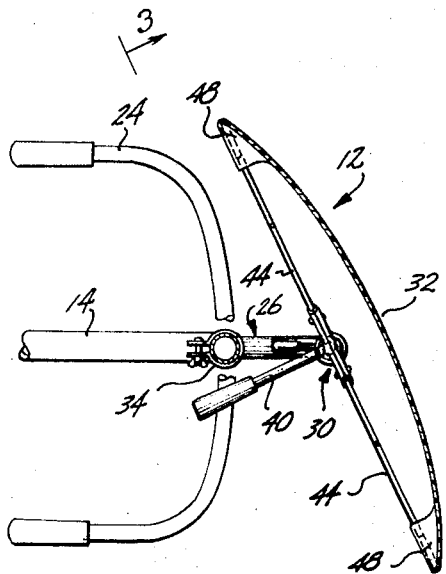
FIG. 2 is a cross-sectional view taken generally along the line 2—2 in FIG. 1.
Figure 3:
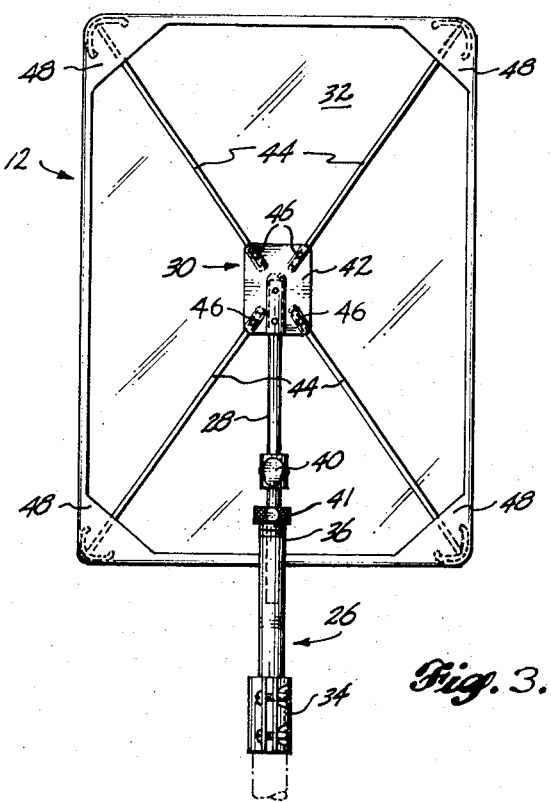
FIG. 3 is a rear elevation view taken generally along the line 3—3 in FIG. 2.

Turning now to the drawings, and referring first to FIG. 1, indicated generally at 10 is a bicycle incorporating sailing apparatus 12 constructed according to an embodiment of the present invention. Bicycle 10 is of conventional construction, including the usual frame 14 supported for travel over the ground through front and rear wheels 16, 18, respectively. Rear wheel 18 is mounted, as is customary, directly on frame 14. Front wheel 16 is mounted on the frame through the usual, generally upright front fork 20. Also included in bicycle 10 are the usual saddle 22 and steering handlebar 24. Handlebar 24 connects in the usual way with fork 20 to permit steering of the front wheel.

Sailing apparatus 12, in general terms, includes a base 26, a mast 28, a sail mounting assembly 30, and a sail 32. The base, mast and sail mounting assembly are referred to collectively herein as sail support means.

Base 26 comprises an elongated angular tubular member whose lower end is detachably mounted on the front end of bicycle frame 14 through a clamp, such as clamp 34. The upper end portion of the base is disposed substantially upright, and includes an upwardly facing socket 36. Socket 36 removably journals the lower end of upright mast 28, which is also a tubular member. Mast 28 can thus turn in socket 36 about a generally upright axis. To enable convenient turning of the mast, there is provided an elongated crank 40 which is secured to the mast, and which extends substantially at a right angle to the longitudinal axis thereof.

The upper end of the tubular member forming socket 36 may be split along a vertical line and threaded for receiving a nut 41 thereon. The configuration of the nut and threaded end of the tubular member are such that the nut may be tightened, if desired, to clamp the upper end of the tubular member against the mast to secure the same in a selected adjusted position. If the nut is not tightened, the mast may be turned freely in its socket.

Sail mounting assembly 30 is what might be thought of as a "knock-down" assembly. More specifically, assembly 30 includes a central member 42 and four outwardly extending, substantially coplanar, diagonal members 44. The inner ends of diagonal members 44 are removably seated in four sockets 46 formed in member 42. Member 42 is suitably anchored to the upper end of mast 28.

According to the invention, sail 32, which has a substantially rectangular outline, is formed of a transparent material, such as any suitable transparent plastic material. The sail is provided with four corner pockets, shown at 48, which freely receive the outer ends of diagonal members 44.

Referring now to FIG. 4, illustrated in dot-dashed outline are the forward portion of a bicycle frame 60, handlebars 62 for the bicycle, and an upright post 64 through which handlebars 62 are connected to the forward fork mounting the front wheel of the bicycle. Indicated generally at 68 is another embodiment of means for mounting the sail at the front of the bicycle.

Mounting means 68 includes an upright tubular member 70 providing a socket which removably journals the lower end of upright mast 28 supporting sail 32.

An upper mounting member, indicated generally at 76, includes a U-shaped forward portion having opposed legs 76a, 76b and a pair of opposed, spaced-apart J-shaped end portions 76c, 76d. Each of legs 76c, 76d, has a long leg portion 76e and an underlying short leg portion 76f which are twisted at 90° from the planes of legs 76a, 76b of the U-shaped portion.

Legs 76a, 76b are adapted to receive the upper portion of member 70 therebetween. A bolt and nut combination 80 extending through accommodating bores in legs 76a, 76b is operable to clamp the legs against the sides of member 70 and thus frictionally secure member 70 therein. Legs 76e, 76f of end portions 76c, 76d hook over handlebars 62 on opposite sides of post 64. Bolt and nut combinations 82 extending through accommodating bores in legs 76e, 76f clamp these legs against opposite sides of the handlebars to frictionally secure end portions 76c, 76d thereon.

A pair of elongated, substantially parallel, laterally spaced bracing bars, or braces, 86, 88 are positioned at one set of their ends on opposite sides of the lower end of member 70. The opposite set of ends of bars 86, 88 are disposed on opposite sides of post 64. A plurality of bores 89 spaced along the lengths of bars 86, 88 are adapted to receive bolts therethrough, such as those illustrated at 90, for clamping the bars into frictional engagement with the lower end of member 70, and bolt and nut combinations, such as those indicated generally at 92 for clamping the bars against opposite sides of post 64.

With member 76 and bars 86, 88 tightly clamped against member 70, handle bars 62 and post 64 as described, they function to detachably mount the sail assembly at the forward end of the bicycle.

With apparatus 12 mounted as shown on bicycle 10, a rider on the bicycle can easily manipulate crank 40 to position sail 32 properly to catch the wind for propelling the bicycle. Because the sail is formed of a transparent material, the rider can easily see the travel path ahead of him. With apparatus 12 positioned entirely in front of the rider, manipulation of the sail best to catch the wind is a relatively simple matter.

When it is desired to demount the apparatus, for whatever reason, this is easily done by removing the sail from diagonal members 44, by then removing the diagonal members from central member 42, and by then lifting the mast out of socket 36. These removed parts can then easily be stored (in a relatively compact form) for future use.

Thus, the present invention proposes a relatively simple and easily manipulated sailing apparatus for a bicycle. Considerable convenience of operation is attained with the apparatus mounted entirely in front of a rider on a bicycle. Obviously, no modification of conventional bicycle construction is required to incorporate the proposed apparatus. Despite the fact that the sail, for convenience purposes, is located in front of a rider, his vision is not obscured, because of the transparent material employed in the sail.

While preferred embodiments of the invention have been described herein, it is appreciated that further variations and modifications may be made without departing from the spirit of the invention.

It is claimed and desired to secure by Letters Patent:

1. Apparatus for sailing a bicycle where the latter includes a frame, said apparatus comprising
    sail support means adapted to be mounted on said bicycle adjacent the front end of the frame, said support means comprising a central member, at least three elongate diagonal members, and means on said central member for detachably connecting an inner set of ends of said diagonal members thereto with said members radiating outwardly therefrom at substantial angles relative to each other and disposed in a substantially common plane, and
    a sail adapted for removable mounting on said support means including a sheet of material having means defining a plurality of spaced apart pockets adjacent peripheral margins of said sheet, said pockets being adapted to receive the outer set of ends of said diagonal members and being so positioned on the sheet that the sheet is tensed when the outer set of ends of said diagonal members are received in said pockets.

2. The apparatus of claim 1, wherein said means for detachably connecting said diagonal members comprises a plurality of sockets formed in said central member, each of which socket is adapted to receive an inner end of a diagonal member.

3. The apparatus of claim 1, wherein said sail support means further comprises a base detachably mountable on the front end of said frame, and a mast removably journalable on said base for infinite angular positional adjustments of the mast about a generally upright axis, and said central member is secured to an upper end portion of said mast.

4. The apparatus of claim 1, wherein said bicycle further includes handlebars and a substantially upright post supporting said handlebars, and wherein said sail support means includes a mounting member detachably mountable on the handlebars with the mounting member projecting forwardly therefrom, a substantially upright tubular member supported adjacent its upper end by said mounting member with the tubular member spaced forwardly of the handlebars, an elongate, rigid brace detachably connectable adjacent one of its ends to the post and adjacent its other end to a lower end portion of said tubular member, and a mast received in a socket provided by said tubular member and journaled therein for infinite angular positional adjustments about a generally upright axis.

5. The apparatus of claim 4, wherein said brace includes means for providing adjustments in the distance between the upright post and the lower end portion of the tubular member and for maintaining a preselected adjusted position permitting mounting of the tubular member in a substantially upright position on bicycles having differing handlebar and post configurations.

6. Apparatus for sailing a bicycle where the latter includes a frame, handlebars, and an upright post supporting said handlebars, said apparatus comprising
    sail support means adapted to be mounted on said bicycle adjacent the front end of the frame including a mounting member detachably mountable on the handlebars with the mounting member projecting forwardly therefrom, a substantially upright tubular member supported adjacent its upper end by said mounting member with the tubular member spaced forwardly of the handlebars, an elongate, rigid brace detachably connectable adjacent one of its ends to the post and adjacent its other end to a lower end portion of said tubular member, and a mast received in a socket provided by said tubular member and journaled therein for infinite angular positional adjustments about a generally upright axis, and
    a sail adapted for removable mounting on said support means.

* * * * *